(12) United States Patent
Lee (10) Patent No.: US 10,843,563 B1
(45) Date of Patent: Nov. 24, 2020

(54) SINGLE DISCONNECT ASSEMBLY FOR DUAL AXLES (71) Applicant: Schaeffler Technologies AG & Co. KG, Herzogenaurach (DE)

(72) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/515,346

(22) Filed: Jul. 18, 2019

(51) Int. Cl.
*B60K 23/08* (2006.01)
*B60K 23/04* (2006.01)
*F16H 48/30* (2012.01)
*F16H 48/10* (2012.01)
*F16H 48/11* (2012.01)

(52) U.S. Cl.
CPC .............. *B60K 23/08* (2013.01); *B60K 23/04* (2013.01); *F16H 48/30* (2013.01); *B60K 2023/046* (2013.01); *F16H 48/11* (2013.01); *F16H 2048/106* (2013.01)

(58) Field of Classification Search
None
See application file for complete search history.

(56) References Cited

U.S. PATENT DOCUMENTS

| | | | | |
|---|---|---|---|---|
| 1,145,295 A | * | 7/1915 | De Witt | F16H 48/08 475/223 |
| 1,243,720 A | * | 10/1917 | Eidson et al. | F16H 48/08 475/223 |
| 2,770,150 A | * | 11/1956 | Culverwell | B60K 17/352 475/221 |
| 4,271,722 A | * | 6/1981 | Campbell | F16H 48/34 475/86 |
| 5,996,720 A | * | 12/1999 | Hunt | B60K 23/08 180/247 |
| 8,313,407 B2 | * | 11/2012 | Ekonen | B60K 23/0808 475/223 |
| 8,382,633 B2 | * | 2/2013 | Cooper | F16H 48/30 475/240 |
| 9,481,243 B2 | * | 11/2016 | Larkin | B60K 23/08 |
| 2010/0041506 A1 | * | 2/2010 | Cooper | F16H 48/30 475/223 |
| 2019/0070955 A1 | | 3/2019 | Lee et al. | |

* cited by examiner

*Primary Examiner* — Dirk Wright (57) ABSTRACT

A disconnect assembly, including: a selector; a first clutch including a first sleeve; and a second clutch including a second sleeve. In a drive mode, the first sleeve non-rotatably connects a first drive gear and a first axle of a first drive train, and the second sleeve is non-rotatably connects a second drive gear to a second axle of a second drive train. In a disconnect mode, relative rotation between the first drive gear and the first axle is enabled and relative rotation between the second drive gear and the second axle is enabled. To transition from the drive mode to the disconnect mode, the selector is displaced by an actuator, the selector is arranged to disconnect the first annular sleeve from the first drive gear or the first axle, and the selector is arranged to disconnect the second annular sleeve from the second drive gear or the second axle.

20 Claims, 10 Drawing Sheets

SINGLE DISCONNECT ASSEMBLY FOR DUAL AXLES

TECHNICAL FIELD

The present disclosure relates to a single disconnect assembly for dual axles for a vehicle with two prime movers and separate drive trains for the two prime movers. In particular, the single disconnect assembly is configured to use a single actuator to connect and disconnect respective drive gears and axles for the two drive trains.

BACKGROUND

For a vehicle having two prime movers and two drive trains, it is known to use a separate assembly and actuator for each drive train to connect and disconnect the respective drive gears and axles for the two drive trains.

SUMMARY

According to aspects illustrated herein, there is provided a dual axle disconnect assembly, including: a threaded selector; a first clutch including a first annular sleeve; and a second clutch including a second annular sleeve. In a drive mode of the dual axle disconnect assembly, the first annular sleeve is arranged to non-rotatably connect a first drive gear of a first drive train of a vehicle to a first axle of the first drive train, and the second annular sleeve is arranged to non-rotatably connect a second drive gear of a second drive train of the vehicle to a second axle of the second drive train. In a disconnect mode of the dual axle disconnect assembly, relative rotation between the first drive gear and the first axle is enabled and relative rotation between the second drive gear and the second axle is enabled. To transition from the drive mode to the disconnect mode, the threaded selector is arranged to be displaced by an actuator, the threaded selector is arranged to disconnect the first annular sleeve from the first drive gear or the first axle, and the threaded selector is arranged to disconnect the second annular sleeve from the second drive gear or the second axle.

According to aspects illustrated herein, there is provided a dual axle disconnect assembly, including: a threaded selector; a first housing; a second housing; a first clutch including a first annular sleeve and a first threaded nut, first threaded nut connected to the first annular sleeve, meshed with the threaded selector, and including at least a portion located within the first housing and non-rotatable within the first housing; and a second clutch including a second annular sleeve and a second threaded nut, the second threaded nut connected to the second annular sleeve, meshed with the threaded selector, and including at least a portion located within the second housing and non-rotatable within the second housing. In a drive mode of the dual axle disconnect assembly, the first annular sleeve non-rotatably connects an axle of a first drive train of a vehicle to a drive gear of the first drive train, and the second annular sleeve non-rotatably connects an axle of a second drive train of the vehicle to a drive gear of the second drive train. To transition from the drive mode to a disconnect mode of the dual axle disconnect assembly, in which relative rotation between the drive gear and the axle of the first drive train is enabled and relative rotation between the drive gear and the axle of the second drive train is enabled: the threaded selector is arranged to be rotated by an actuator; the threaded selector is arranged to displace the first threaded nut and the first annular sleeve in the first direction; and the threaded selector is arranged to displace the second threaded nut and the second annular sleeve in a second direction, opposite the first direction.

According to aspects illustrated herein, there is provided a method of operating a dual axle disconnect assembly, including: for a drive mode of the dual axle disconnect assembly, non-rotatably connecting, with an annular sleeve of a first clutch of the dual axle disconnect assembly, an axle of a first drive train of a vehicle to a drive gear of a first drive train, and non-rotatably connecting, with an annular sleeve of a second clutch of the dual axle disconnect assembly, an axle of a second drive train of the vehicle to a drive gear of a second drive train; and transitioning from the drive mode to a disconnect mode of the dual axle disconnect assembly by rotating, with an actuator, a threaded selector connected to the annular sleeve of the first clutch and meshed with a threaded nut of the first clutch, and connected to the annular sleeve of the second clutch and meshed with a threaded nut of the second clutch, displacing, with the threaded selector, the threaded nut and the annular sleeve of the first clutch with respect to the axle of the first drive train, and the threaded nut and the annular sleeve of the second clutch with respect to the axle of the second drive train, and enabling relative rotation between the drive gear and the axle of the first drive train, and between the drive gear and the axle of the second drive train.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
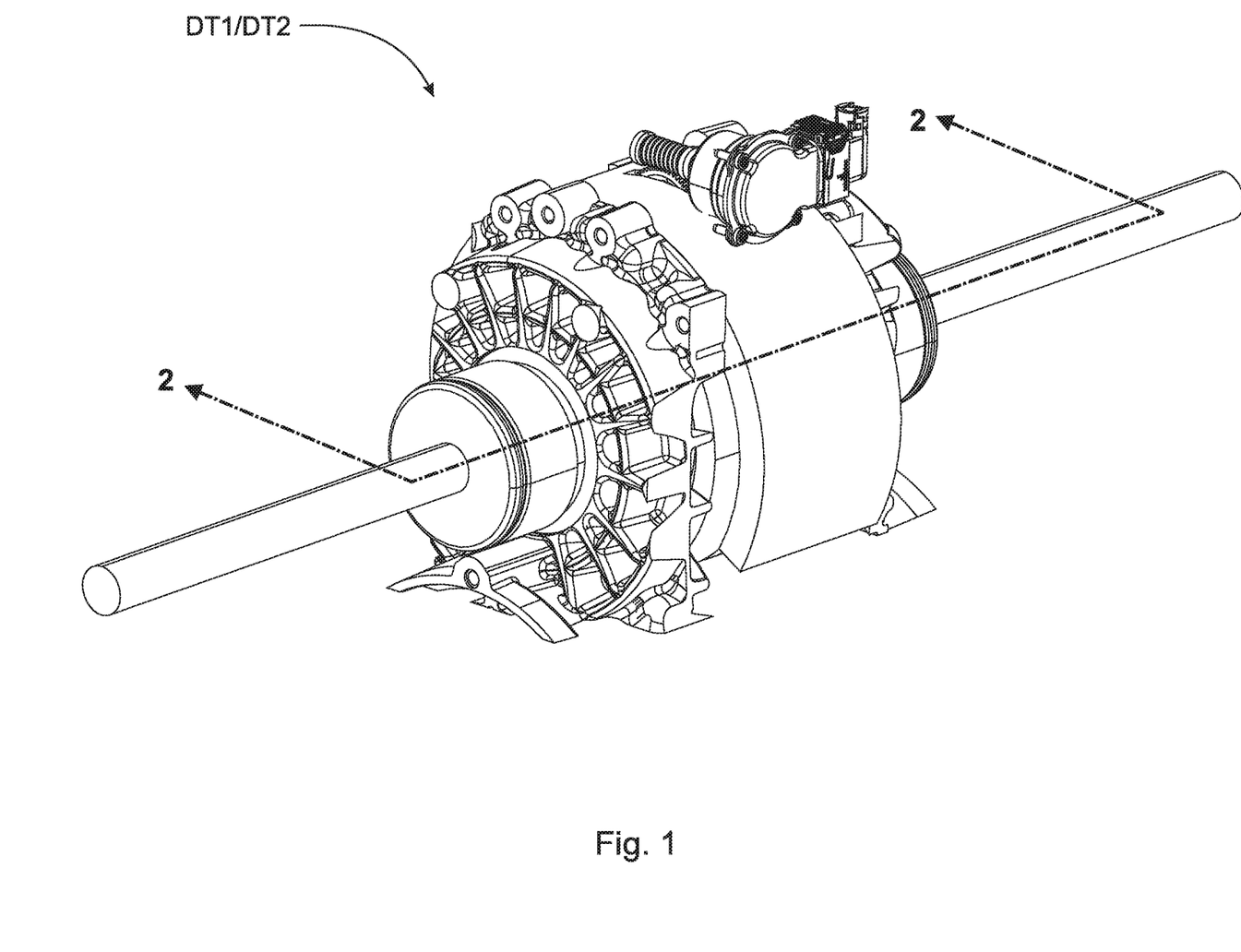
FIG. 1 is an isometric view of dual drive trains and a dual axle disconnect.

FIG. 1 is an isometric view of dual drive trains and dual axle disconnect 100.

Figure 2:
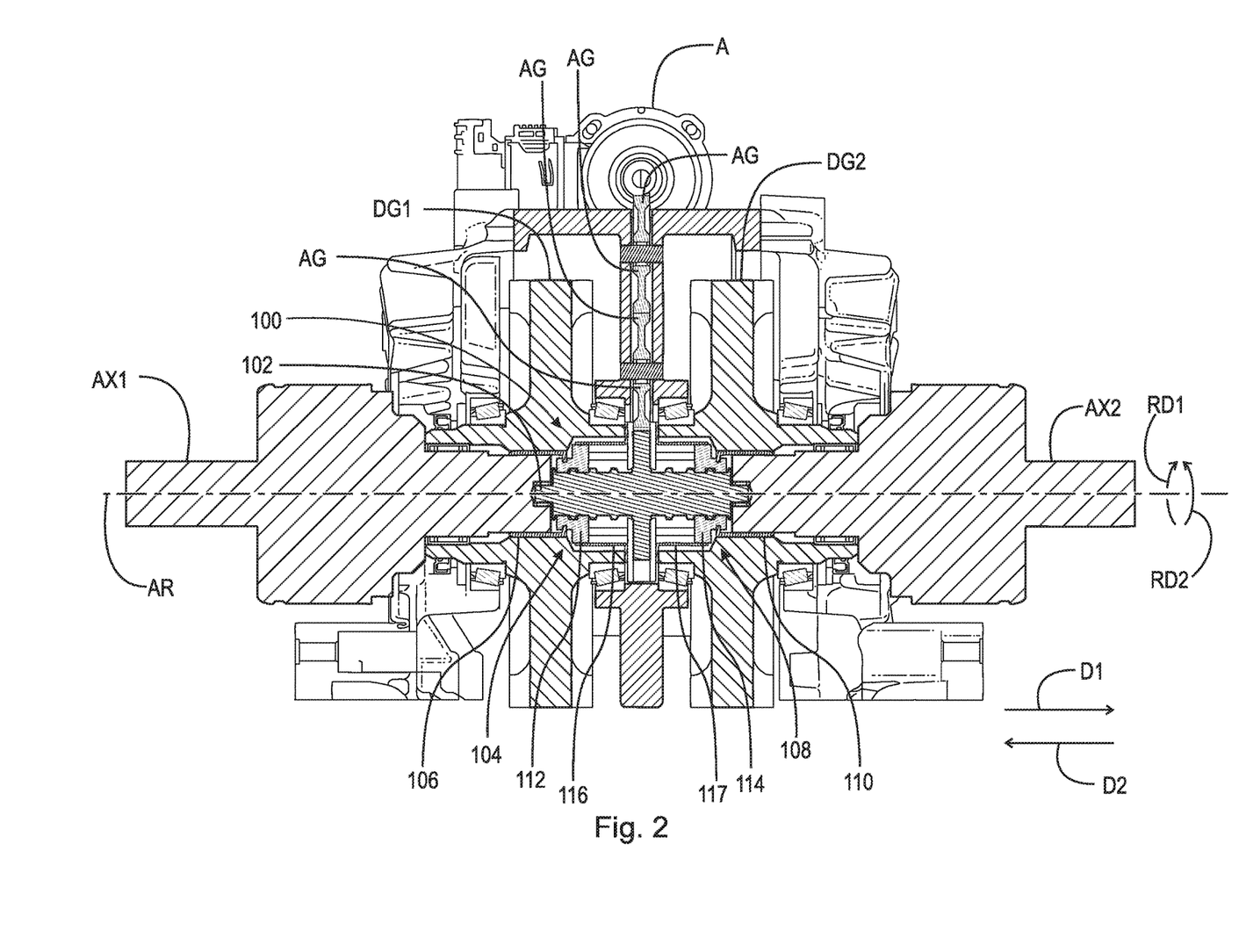
FIG. 2 is a cross-section generally along line 2-2 in FIG. 1, with the dual axle disconnect in a drive mode.

FIG. 2 is a cross-section generally along line 2-2 in FIG. 1, with dual axle disconnect 100 in a drive mode. The following should be viewed in light of FIGS. 1 and 2. Dual axle disconnect assembly 100 includes: threaded selector 102; clutch 104 including annular sleeve 106; clutch 108 including annular sleeve 110; threaded nut 112 meshed with threaded selector 102; threaded nut 114 meshed with threaded selector 102; housing 116; and housing 117. At least respective portions of threaded selector 102 and threaded nut 112 are located, or disposed, within housing 116. At least respective portions of threaded selector 102 and threaded nut 114 are located, or disposed, within housing 117. By a threaded nut "meshed" with a threaded selector, we mean that the threaded selector passes through an opening in the threaded nut and threads on a radially outer surface of the threaded selector are engaged and in contact with threads on a radially inner surface of the threaded nut bounding the opening in the threaded nut.

Figure 3:
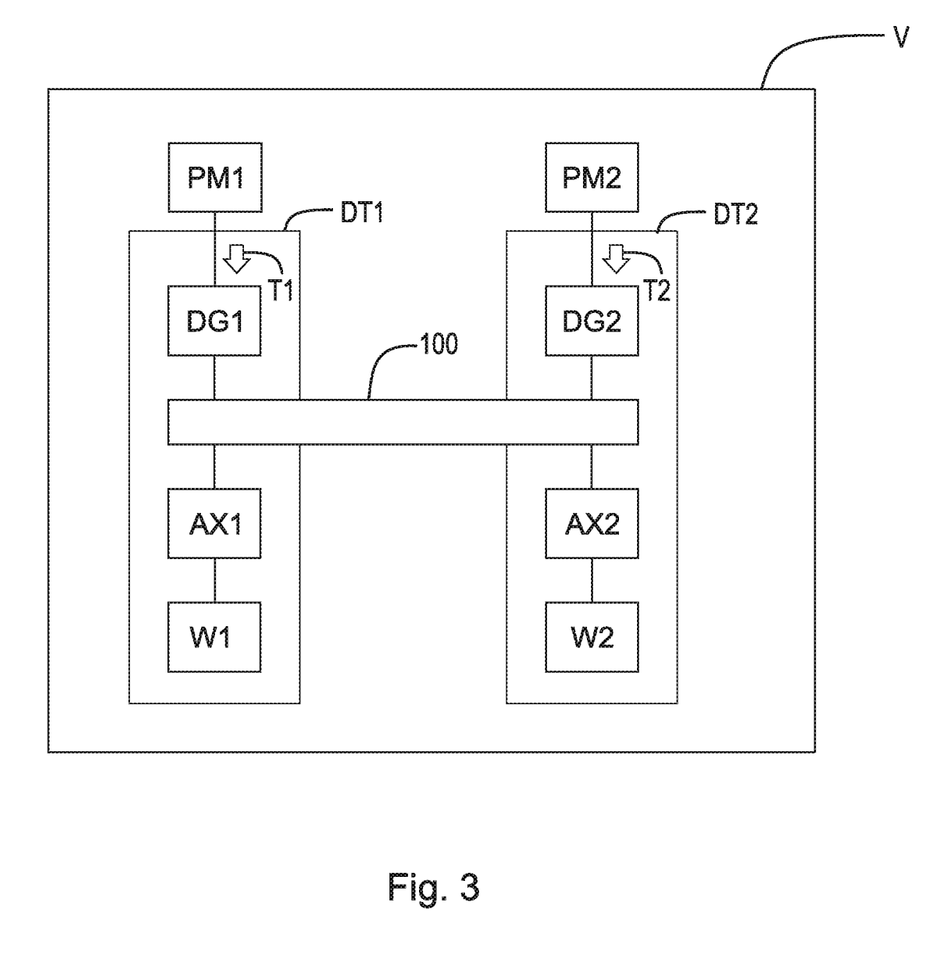
FIG. 3 is a schematic block diagram of the drive trains of FIG. 1 in a vehicle.

FIG. 3 is a schematic block diagram of the drive trains of FIG. 1 in a vehicle. The following should be viewed in light of FIGS. 1 through 3. Assembly 100 is arranged to be included in vehicle V. In the example of FIG. 3, vehicle V includes prime movers PM1 and PM2 and associated drive trains DT1 and DT2. Drive train DT1 includes drive gear or gears DG1, axle AX1, and wheel W1. Drive train DT2 includes drive gear or gears DG2, axle AX2, and wheel W2. Prime mover PM1 is arranged to provide torque T1 to wheel W1 via gear DG1 and axle AX1. Prime mover PM2 is arranged to provide torque T2 to wheel W2 via gear DG2 and axle AX2. Prime movers PM1 and PM2 can be any vehicular prime mover known in the art, including, but not limited to, electric motors or internal combustion engines. Assembly 100 is arranged to be located between drive gears DG1 and DG2 and axles AX1 and AX2, respectively.

Figure 4:
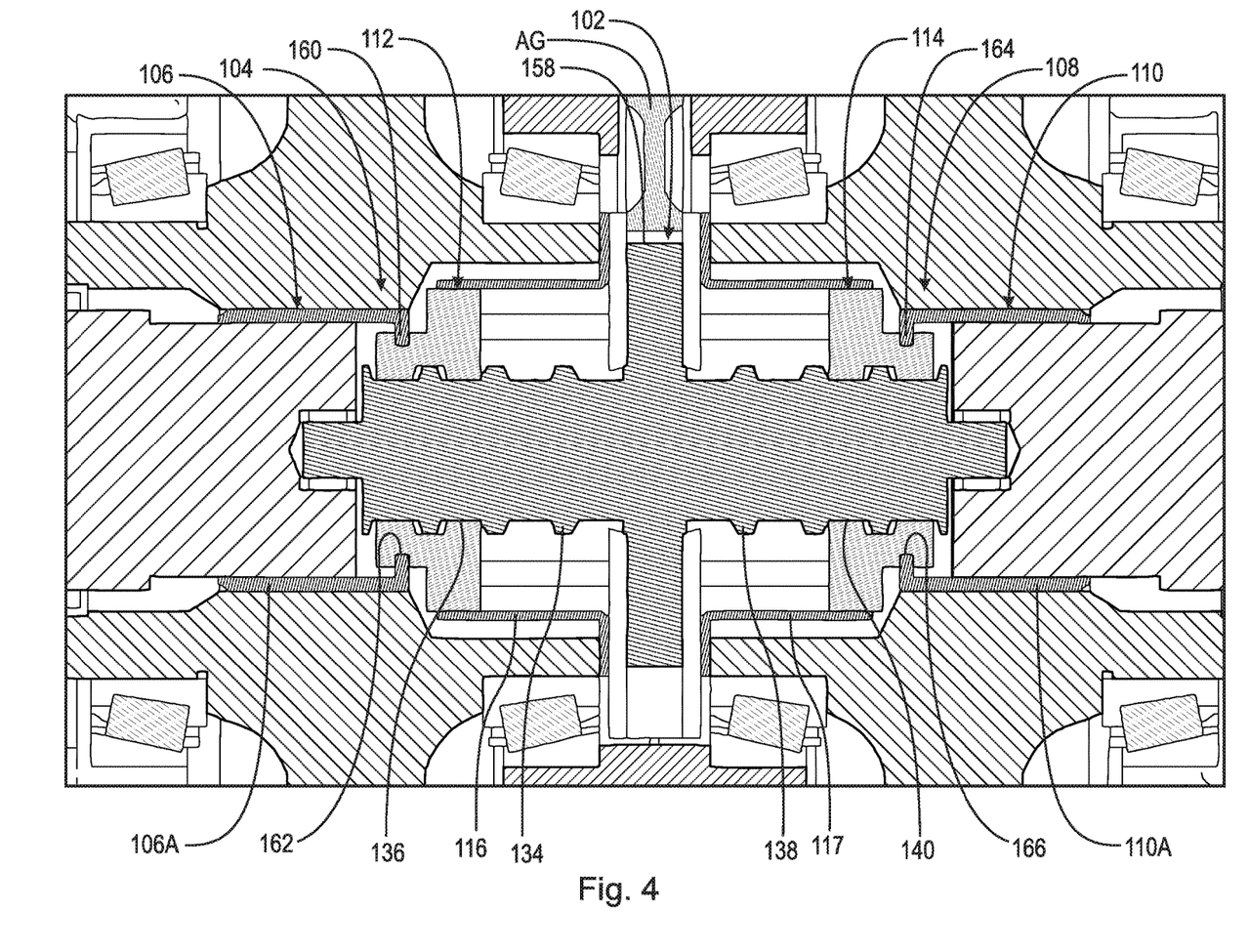
FIG. 4 is a detail of FIG. 2.

FIG. 4 is a detail of FIG. 2. The following should be viewed in light of FIGS. 1 through 4. In the drive mode of dual axle disconnect assembly 100: annular sleeve 106 non-rotatably connects drive gear DG1 and axle AX1; and annular sleeve 110 non-rotatably connects drive gear DG2 and axle AX2.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs.

Figure 5:
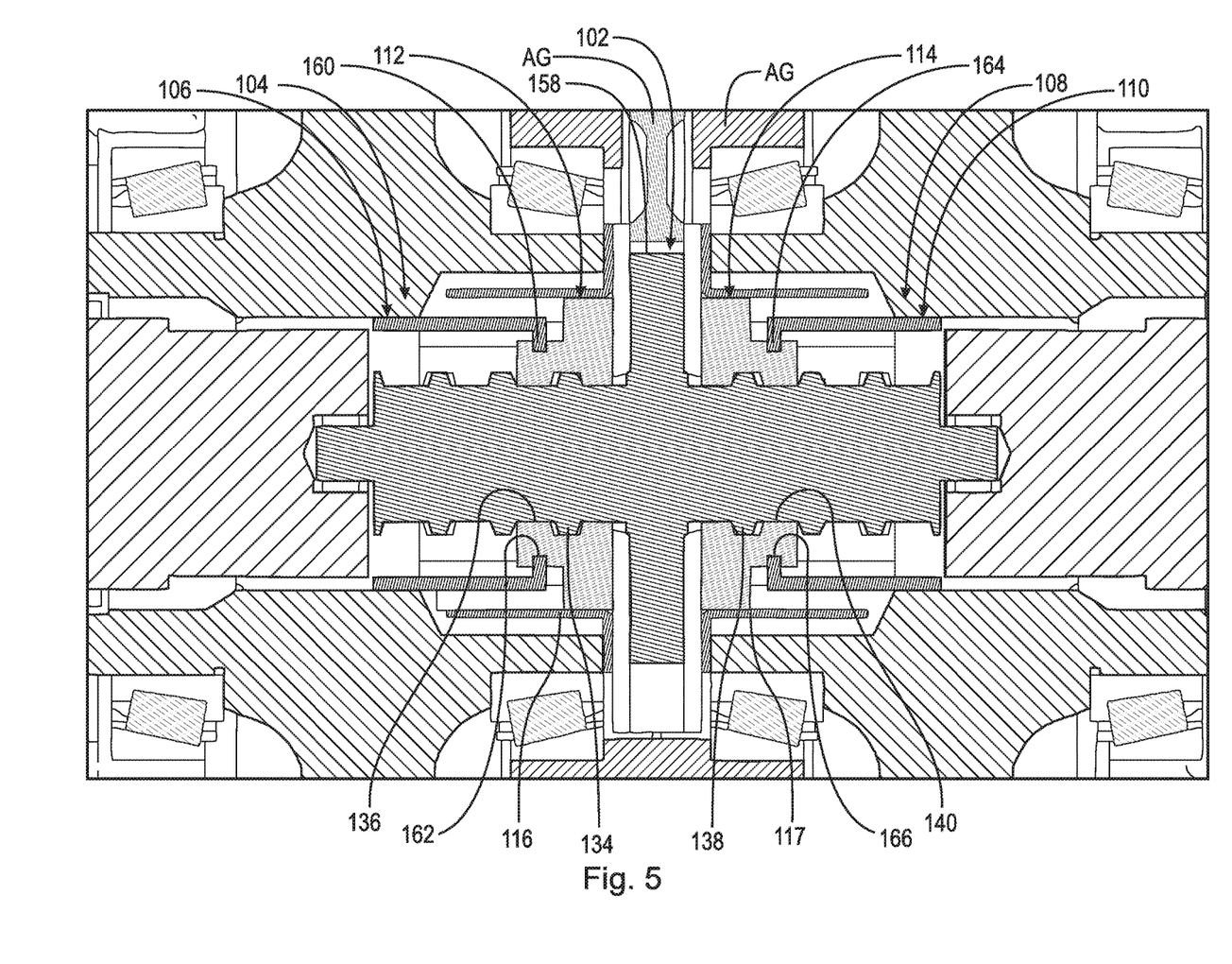
FIG. 5 is the detail of FIG. 4 with the dual axle disconnect in a disconnect mode.

FIG. 5 is the detail of FIG. 4 with dual axle disconnect 100 in a disconnect mode. The following should be viewed in light of FIGS. 1 through 5. In the disconnect mode of dual axle disconnect assembly 100: relative rotation between drive gear DG1 and axle AX1 is enabled; and relative rotation between drive gear DG2 and axle AX2 is enabled. Thus, in the disconnect mode: drive gear DG1 and axle AX1 are disconnected; and drive gear DG2 and axle AX2 are disconnected. To transition from the drive mode to the disconnect mode, threaded selector 102 is arranged to: disconnect sleeve 106 from one of drive gear DG1 or axle AX1; and to disconnect sleeve 110 from one of drive gear DG2 or axle AX2. In the example of FIG. 1, selector 102 is arranged to be displaced by actuator A to: disconnect sleeve 106 from axle AX1; and to disconnect sleeve 110 from axle AX2. Actuator A can be any actuator known in the art. In an example embodiment, assembly 100 includes actuator A.

Figure 6:
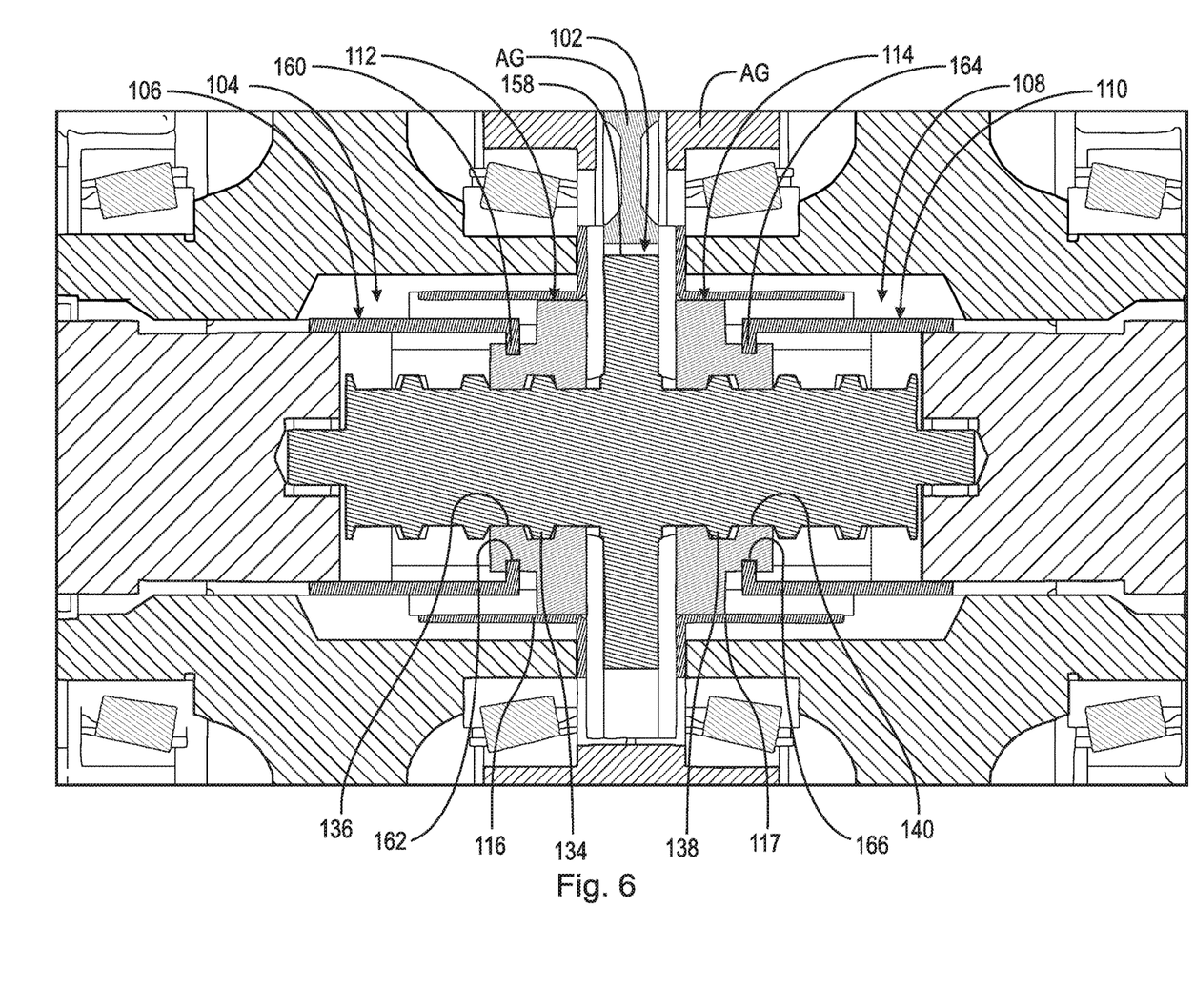
FIG. 6 is a detail of the dual axle in FIG. 1 in the disconnect mode.

FIG. 6 is a detail with dual axle disconnect 100 in a disconnect mode. In the example of FIG. 6, selector 102 is arranged to be displaced by actuator A to: disconnect sleeve 106 from drive gear DG1; and to disconnect sleeve 110 from drive gear DG2.

Thus, to transition between the disconnect and drive modes, selector 102 is arranged to: displace annular sleeve 106 with respect to drive gear DG1 and axle AX1; and displace annular sleeve 110 with respect to drive gear DG2 and axle AX2.

To transition from the drive mode to the disconnect mode, threaded selector 102 is arranged to be rotated in rotational direction RD1 by actuator A. To transition from the disconnect mode to the drive mode, threaded selector 102 is arranged to be rotated in rotational direction RD2, opposite rotational direction RD1, by actuator A. Directions RD1 and RD2 are with respect to axis of rotation AR of threaded selector 102. That is, directions RD1 and RD2 are around axis AR.

In the drive mode, at least portion 106A of annular sleeve 106 is: disposed about axle AX1; in contact with axle AX1; disposed within drive gear DG1, and in contact with drive gear DG1. In the drive mode, at least portion 110A of annular sleeve 110 is: disposed about axle AX2; in contact with axle AX2; disposed within drive gear DG2, and in contact with drive gear DG2.

In an example embodiment, in the disconnect mode: annular sleeve 106 is in contact with drive gear DG1 and free of contact with axle AX1; and annular sleeve 110 is in contact with drive gear DG2 and free of contact with axle AX2. In an example embodiment (not shown), in the disconnect mode: annular sleeve 106 is free of contact with drive gear DG1 and in contact with axle AX1; and annular sleeve 110 is free of contact with drive gear DG2 and in contact with axle AX2.

Annular sleeve 106 is: directly connected to threaded nut 112; axially fixed with respect to threaded nut 112; and rotatable with respect to threaded nut 112. Annular sleeve 110 is: directly connected to threaded nut 114; axially fixed with respect to threaded nut 114; and rotatable with respect to threaded nut 114. By "axially fixed" components, we mean that with the exception of lash inherent in a connection between the components, the components move as a unit in an axial direction. For assembly 100, axial directions are opposite directions D1 and D2, parallel to axis of rotation AR.

To transition from the drive mode to the disconnect mode: threaded selector 102 is arranged to be rotated by actuator A in direction RD1 to: displace threaded nut 112 and annular sleeve 106 in direction D1; and displace threaded nut 114 and annular sleeve 110 in direction D2. To transition from the disconnect mode to the drive mode: threaded selector 102 is arranged to be rotated by actuator A in direction RD2 to: displace threaded nut 112 and annular sleeve 106 in direction D2; and displace threaded nut 114 and annular sleeve 110 in direction D1.

Thus, to transition from the drive mode to the disconnect mode: threaded nut 112 displaces along threaded selector 102 in direction D1; and threaded nut 114 displace along threaded selector 102 in direction D2. Thus, to transition from the disconnect mode to the drive mode, threaded nut 112 displaces along threaded selector 102 direction D2; and threaded nut 114 displaces along threaded selector 102 in direction D1. It is understood that the orientation shown for directions RD1 and RD2 in FIGS. 2 and 3 are an example, and that disconnect 100 can be configured to reverse the association of directions RD1 and RD2 with respect to directions D1 and D2, shown in FIGS. 2 and 3.

Figure 7:
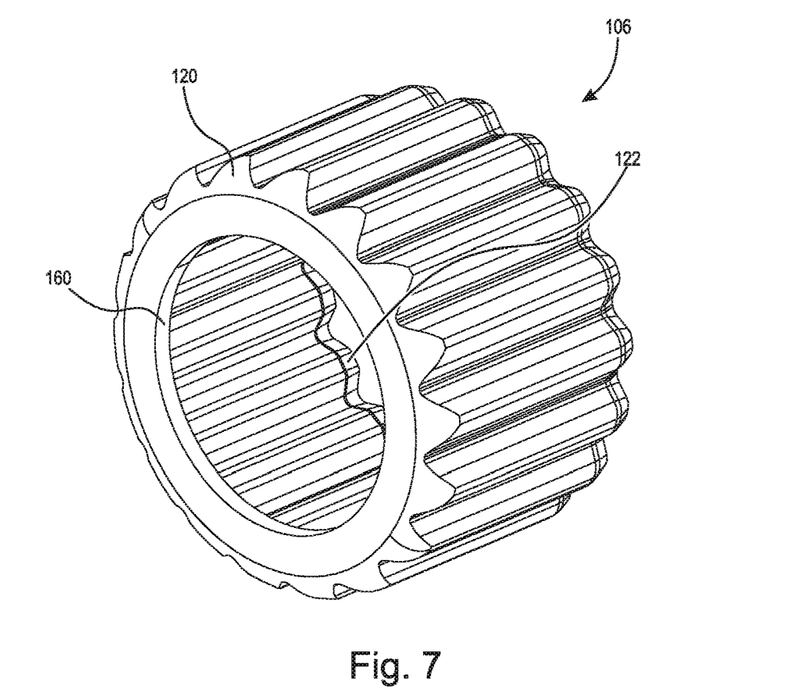
FIG. 7 is an isometric view of an annular sleeve shown in FIG. 2.

FIG. 7 is an isometric view of annular sleeve 106 shown in FIG. 2.

Figure 8:
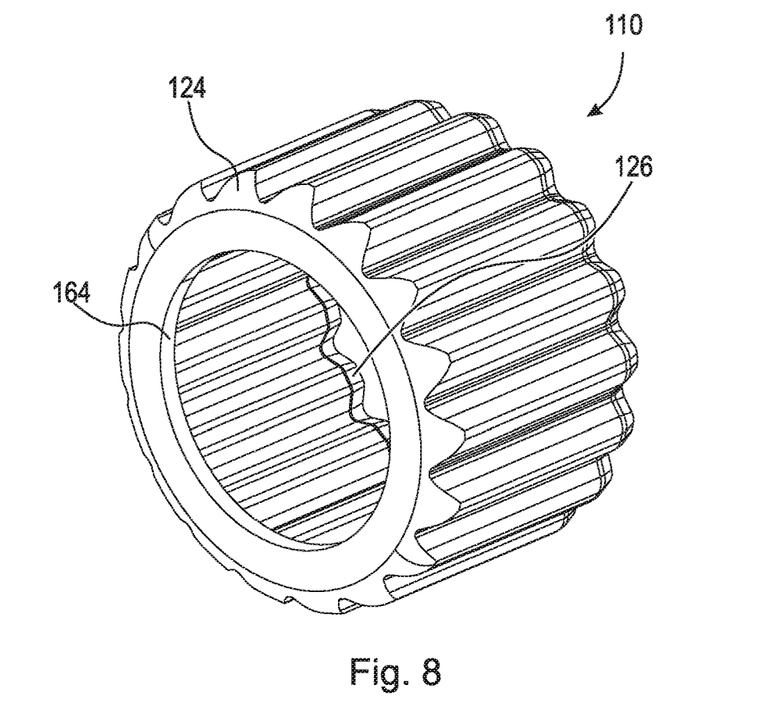
FIG. 8 is an isometric view of an annular sleeve shown in FIG. 2.

FIG. 8 is an isometric view of annular sleeve 110 shown in FIG. 2. The following should be viewed in light of FIGS. 1 through 8. In an example embodiment, annular sleeve 106 includes: radially outwardly extending splines 120 arranged to non-rotatably connect to drive gear DG1; and radially inwardly extending splines 122 arranged to non-rotatably connect to axle AX1 in the drive mode. In an example embodiment, annular sleeve 110 includes: radially outwardly extending splines 124 arranged to non-rotatably connect to drive gear DG2; and radially inwardly extending splines 126 arranged to non-rotatably connect to axle AX2 in the drive mode.

Figure 9:
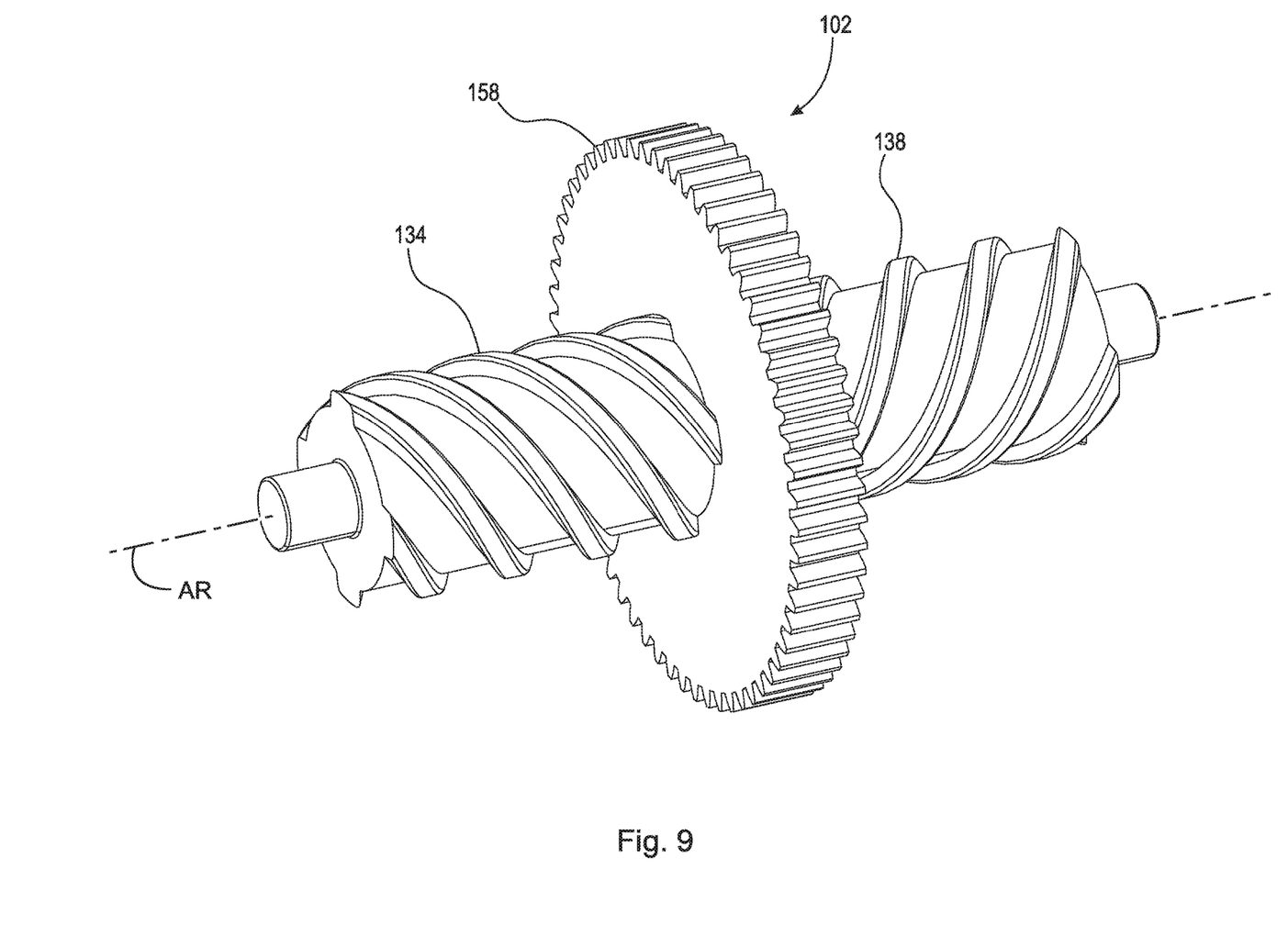
FIG. 9 is an isometric view of a threaded selector shown in FIG. 2.

FIG. 9 is an isometric view of threaded selector 102 shown in FIG. 2.

Figure 10:
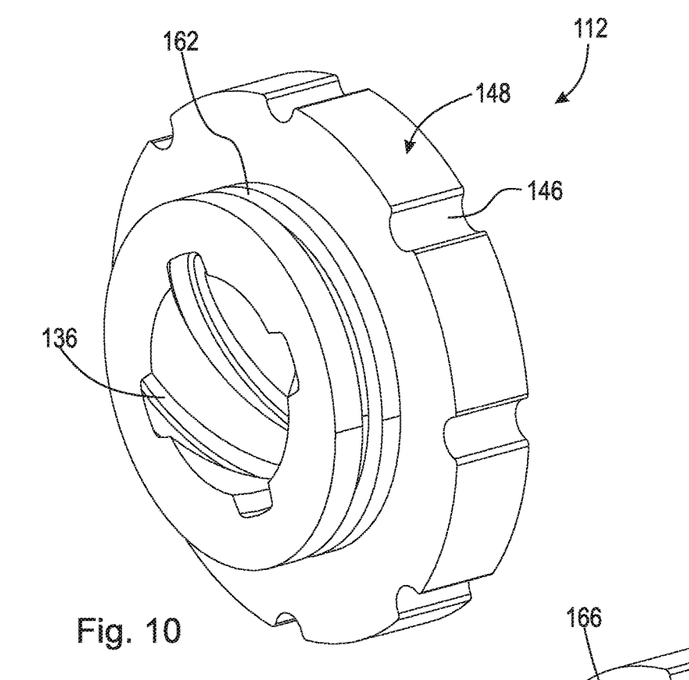
FIG. 10 is an isometric view of a threaded nut shown in FIG. 2.

FIG. 10 is an isometric view of threaded nut 112 shown in FIG. 2.

Figure 11:
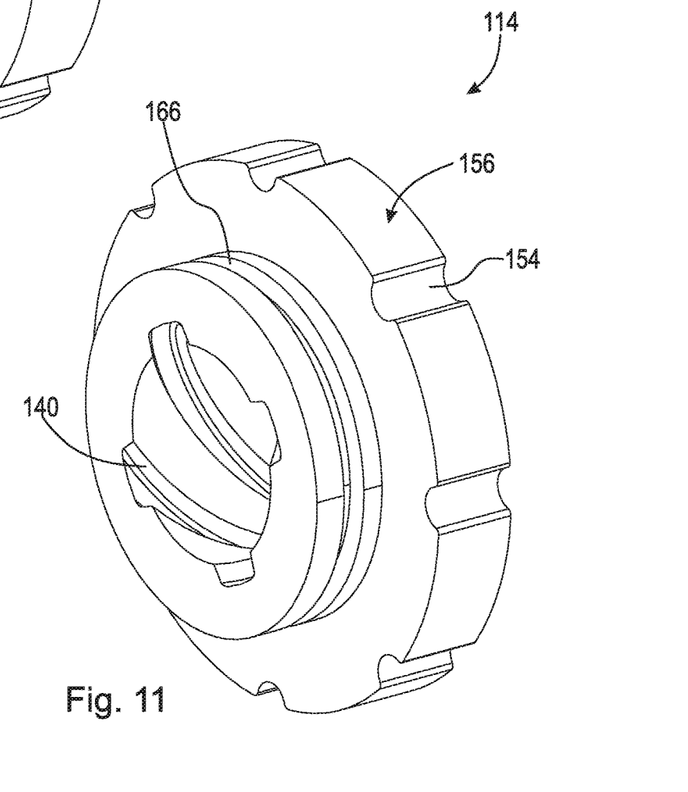
FIG. 11 is an isometric view of a threaded nut shown in FIG. 2.

FIG. 11 is an isometric view of threaded nut 114 shown in FIG. 2. The following should be viewed in light of FIGS. 1 through 11. Threaded selector 102 includes: threads 134 meshed with threads 136 of threaded nut 112; and threads 138 meshed with threads 140 of threaded nut 114. In the example of FIG. 1, threads 134 and 136 are right hand threads, and threads 138 and 140 are left hand threads. By "right hand thread" we mean a thread whose helix moves downward when the screw is inserted vertically from above in a fixed mating thread and turned clockwise. By "left hand thread" we mean a thread whose helix moves upward when the screw is inserted vertically from above in a fixed mating thread and turned clockwise.

Figure 12:
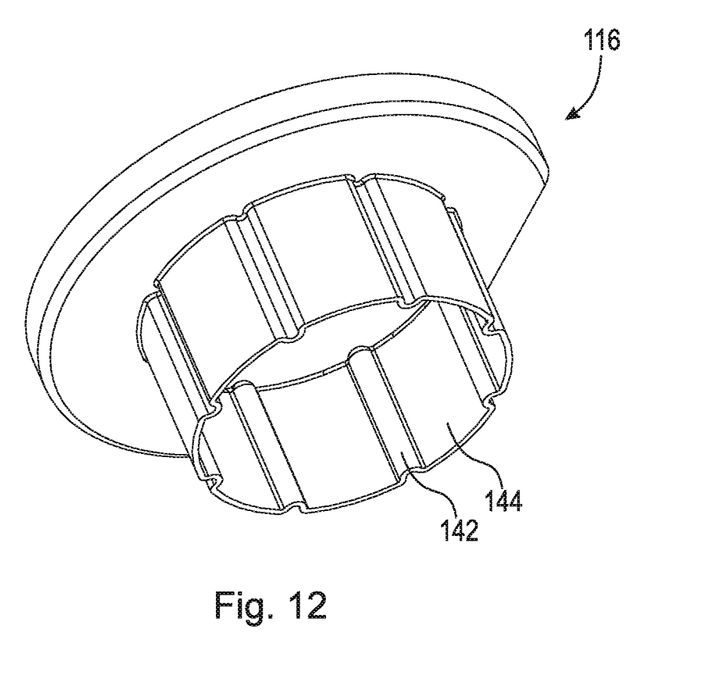
FIG. 12 is an isometric view of a housing shown in FIG. 2.

FIG. 12 is an isometric view of housing 116 shown in FIG. 2.

Figure 13:
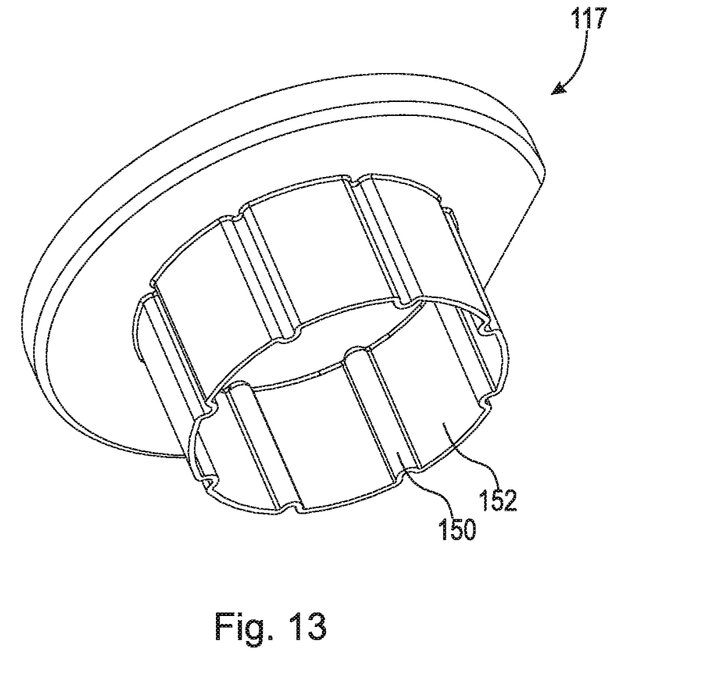
FIG. 13 is an isometric view of a housing shown in FIG. 2.

FIG. 13 is an isometric view of housing 117 shown in FIG. 2. The following should be viewed in light of FIGS. 1 through 13. Threaded nut 112 and threaded nut 114 are displaceable in directions D1 and D2 within housing 116 and housing 117, respectively, and are non-rotatable with respect to housing 116 and housing 117, respectively. For example: housing 116 includes protrusions 142 extending radially inwardly from radially inner surface 144 of housing 116, and disposed within grooves 146 of nut 112 extending radially inwardly from radially outer surface 148 of nut 112; and housing 117 includes protrusions 150 extending radially inwardly from radially inner surface 152 of housing 117, and disposed within grooves 154 of nut 114 extending radially inwardly from radially outer surface 156 of nut 114. Thus: protrusions 142 in grooves 146 preclude rotation of nut 112 around axis AR and with respect to housing 116; and protrusions 150 in grooves 154 preclude rotation of nut 114 around axis AR and with respect to housing 117.

Because threaded nut 112 and threaded nut 114 are non-rotatable with respect to housing 116 and housing 117, respectively, the rotation of threads 134 and 138 within threaded nut 112 and threaded nut 114, respectively, results in threaded nut 112 and threaded nut 114 sliding along protrusions 142 and 150, respectively, in directions D1 and D2.

In an example embodiment, threaded selector 102 includes input gear 158 arranged to receive rotational torque from one or more gears AG of actuator A, to rotate threaded selector 102 in directions RD1 and RD2. In an example embodiment, input gear 158 is located between annular sleeve 106 and annular sleeve 110 and threads 134 and 138 extend from gear 158 in directions D2 and D1, respectively.

In an example embodiment: sleeve 106 includes radially inwardly and circumferentially extending lip 160 located within circumferentially extending slot 162 of nut 112; and sleeve 110 includes radially inwardly and circumferentially extending lip 164 located within circumferentially extending slot 166 of nut 114. The above configuration enables relative rotation between sleeve 106 and nut 112, and between sleeve 110 and nut 114, while precluding axial displacement between sleeve 106 and nut 112 and between sleeve 110 and nut 114, with the exception of lash inherent in a lip and slot interface.

The following should be viewed in light of FIGS. 1 through 13. The following describes a method of operating a dual axle disconnect assembly. Although the method is presented as a sequence of steps for clarity, no order should be inferred from the sequence unless explicitly stated. A first step, for a drive mode of dual axle disconnect assembly 100: non-rotatably connects, with annular sleeve 106 of clutch 104 of dual axle disconnect assembly 100, axle AX1 of drive train DT1 of vehicle V to drive gear DG1 of drive train DT1; and non-rotatably connects, with annular sleeve 110 of clutch 108 of dual axle disconnect assembly 100, axle AX2 of drive train DT2 of vehicle V to drive gear DG2 of drive train DT2. A second step transitions from the drive mode to a disconnect mode of dual axle disconnect assembly 100 by: rotating, with actuator A, threaded selector 102 connected to annular sleeve 106 and meshed with threaded nut 112 of clutch 104, and connected to annular sleeve 110 and meshed with threaded nut 114 of clutch 108; displacing, with threaded selector 102, threaded nut 112 and annular sleeve 106 with respect to axle AX1, and threaded nut 114 and annular sleeve 110 with respect to axle AX2; and enabling relative rotation between drive gear DG1 and axle AX1, and between drive gear DG2 and axle AX2.

Transitioning from the drive mode to the disconnect mode includes: displacing, with threaded selector 102 and in direction D1, parallel to axis of rotation AR of threaded selector 102, threaded nut 112 within housing 116; preventing, with housing 116, rotation of threaded nut 112 around axis of rotation AR; displacing, with threaded selector 102 and in direction D2, opposite direction D1, threaded nut 114 within housing 117; and preventing, with housing 117, rotation of threaded nut 114 around axis of rotation AR.

Transitioning from the drive mode to the disconnect mode includes: displacing, with threaded selector 102, threaded nut 112 and threaded nut 114 toward each other; displacing, with threaded nut 112, annular sleeve 106 toward annular sleeve 110; and displacing, with threaded 114, annular sleeve 110 toward annular sleeve 106.

A third step: rotates annular sleeve 106 with respect to threaded nut 112; and rotates annular sleeve 110 with respect to threaded nut 114.

Dual axle disconnect assembly 100 and a method of operating dual axle disconnect assembly 100 provide a single mechanism and process for disconnecting dual axles AX1 and AX2 from drive gears DG1 and DG2, respectively, eliminating the need for two separate disconnect mechanisms, and reducing the footprint and cost of providing means for disconnecting axles AX1 and AX2 in vehicle V.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AG gear, actuator
AR axis of rotation
AX1 axle
AX2 axle
D1 direction
D2 direction
DG1 drive gear
DG2 drive gear
DT1 drive train
DT2 drive train
PM1 prime mover
PM2 prime mover
RD1 rotational direction
RD2 rotational direction
T1 torque
T2 torque
V vehicle
W1 wheel
W2 wheel
100 dual axle disconnect assembly
102 threaded selector
104 clutch
106 annular sleeve
106A portion, annular sleeve
108 clutch
110 annular sleeve
110A portion, annular sleeve
112 threaded nut
114 threaded nut
116 housing
117 housing
120 spline, sleeve 106
122 spline, sleeve 106
124 spline, sleeve 110
126 spline, sleeve 110
134 threads, selector
136 threads, nut 112
138 threads, selector
140 threads, nut 114
142 protrusion, housing 116
144 radially inner surface, housing 116
146 groove, nut 112
148 radially outer surface, nut 112
150 protrusion, housing 117
152 radially inner surface, housing 117
154 groove, nut 114
156 radially outer surface, nut 114
158 input gear, selector
160 lip, sleeve 106
162 slot, nut 112
164 lip, sleeve 110
166 slot, nut 114

The invention claimed is:

1. A dual axle disconnect assembly, comprising:
a threaded selector;
a first clutch including a first annular sleeve; and,
a second clutch including a second annular sleeve, wherein:
in a drive mode of the dual axle disconnect assembly, the first annular sleeve is arranged to non-rotatably connect a first drive gear of a first drive train of a vehicle to a first axle of the first drive train, and the second annular sleeve is arranged to non-rotatably connect a second drive gear of a second drive train of the vehicle to a second axle of the second drive train;
in a disconnect mode of the dual axle disconnect assembly, relative rotation between the first drive gear and the first axle is enabled and relative rotation between the second drive gear and the second axle is enabled; and,
to transition from the drive mode to the disconnect mode, the threaded selector is arranged to be displaced by an actuator, the threaded selector is arranged to disconnect the first annular sleeve from the first drive gear or the first axle, and the threaded selector is arranged to disconnect the second annular sleeve from the second drive gear or the second axle.

2. The dual axle disconnect assembly of claim 1, wherein:
to transition from the drive mode to the disconnect mode, the threaded selector is arranged to be rotated in a first rotational direction by the actuator; and,
to transition from the disconnect mode to the drive mode, the threaded selector is arranged to be rotated in a second rotational direction, opposite the first rotational direction, by the actuator.

3. The dual axle disconnect assembly of claim 1, wherein in the drive mode:
at least a portion of the first annular sleeve is disposed about the first axle and in contact with the first axle and the first drive gear; and,
at least a portion of the second annular sleeve is disposed about the second axle and in contact with the second axle and the second drive gear.

4. The dual axle disconnect assembly of claim 1, wherein to transition from the drive mode to the disconnect mode, the threaded selector is arranged to:
be rotated in a first rotational direction by the actuator;
displace the first annular sleeve in a first direction; and,
displace the second annular sleeve in a second direction, opposite the first direction.

5. The dual axle disconnect assembly of claim 4, wherein to transition from the disconnect mode to the drive mode, the threaded selector is arranged to:
be rotated in a second rotational direction, opposite the first rotational direction, by the actuator;
displace the first annular sleeve in the second direction; and,
displace the second annular sleeve in the first direction.

6. The dual axle disconnect assembly of claim 1, wherein:
the first annular sleeve includes a first plurality of splines arranged to non-rotatably connect to the first axle in the drive mode;
the second annular sleeve includes a second plurality of splines arranged to non-rotatably connect to the second axle in the drive mode; and,
to transition from the drive mode to the disconnect mode, the threaded selector is arranged to:
be rotated by the actuator;
disconnect the first plurality of splines from the first axle; and,
disconnect the second plurality of splines from the second axle.

7. The dual axle disconnect assembly of claim 1, wherein:
the first clutch includes a first threaded nut meshed with the threaded selector and axially fixed to the first annular sleeve;
the second clutch includes a second threaded nut meshed with the threaded selector and axially fixed to the second annular sleeve; and,
to transition from the drive mode to the disconnect mode the threaded selector is arranged to:
be rotated by the actuator in a first rotational direction to displace the first threaded nut and the first annular sleeve in a first direction; and,
displace the second threaded nut and the second annular sleeve in a second direction, opposite the first direction.

8. The dual axle disconnect assembly of claim 7, wherein the first annular sleeve is rotatable about the first threaded nut, and the second annular sleeve is rotatable about the second threaded nut.

9. The dual axle disconnect assembly of claim 7, wherein to transition from the disconnect mode to the drive mode, the threaded selector is arranged to:
be rotated by the actuator in a second rotational direction, opposite the first rotational direction;
displace the first threaded nut and the first annular sleeve in the second direction; and,
displace the second threaded nut and the second annular sleeve in the first direction.

10. The dual axle disconnect assembly of claim 1, wherein:
the threaded selector includes a plurality of right hand threads, and a plurality of left hand threads;
the first clutch includes a first threaded nut meshed with the plurality of right hand threads and axially fixed to the first annular sleeve; and,
the second clutch includes a second threaded nut meshed with the plurality of left hand threads.

11. The dual axle disconnect assembly of claim 10, wherein:
to transition from the drive mode to the disconnect mode the threaded selector is arranged to:
be rotated in a first rotational direction with respect to the first threaded nut and the second threaded nut;
displace the first threaded nut along the threaded selector in a first direction; and,
displace the second threaded nut along the threaded selector in a second direction, opposite the first direction; and,
to transition from the disconnect mode to the drive mode, the threaded selector is arranged to:
be rotated in a second rotational direction, opposite the first rotational direction, with respect to the first threaded nut and the second threaded nut;
displace the first threaded nut along the threaded selector in the second direction; and,
displace the second threaded nut along the threaded selector in the first direction.

12. The dual axle disconnect assembly of claim 1, further comprising:
a first housing; and,
a second housing, wherein:
the first clutch includes a first threaded nut:
meshed with the threaded selector;
axially fixed to the first annular sleeve;
including at least a portion disposed within the first housing; and,
non-rotatable with respect to the first housing;
the second clutch includes a second threaded nut:
meshed with the threaded selector;
axially fixed to the second annular sleeve;
including at least a portion disposed within the second housing; and,
to transition from the drive mode to the disconnect mode:
the threaded selector is arranged to be rotated;
the first threaded nut is arranged to displace within the first housing in a first direction; and,
the second threaded nut is arranged to displace within the second housing in a second direction, opposite the first direction.

13. The dual axle disconnect assembly of claim 1, wherein:
the first annular sleeve includes a first plurality of splines;
the second annular sleeve includes a second plurality of splines; and,
in the drive mode, the first plurality of splines is non-rotatably connected to the first drive gear, and the second plurality of splines is non-rotatably connected to the second axle.

14. The dual axle disconnect assembly of claim 1, wherein:
the threaded selector includes an input gear arranged to receive rotational torque from the actuator; and,
the input gear is located between the first annular sleeve and the second annular sleeve.

15. The dual axle disconnect assembly of claim 14, wherein:
the threaded selector includes a first plurality of threads extending from the input gear in a first direction, and a second plurality of threads extending from the input gear in a second direction, opposite the first direction;
the first clutch includes a first threaded nut meshed with the first plurality of threads;
the second clutch includes a second threaded nut meshed with the second plurality of threads; and,
to transition from the drive mode to the disconnect mode, the threaded selector is arranged to be rotated by the actuator in a first rotational direction to displace:
the first threaded nut and the first annular sleeve in a first direction; and,
the second threaded nut and the second annular sleeve in a second direction, opposite the first direction.

16. A dual axle disconnect assembly, comprising:
a threaded selector;
a first housing;
a second housing;
a first clutch including a first annular sleeve and a first threaded nut, the first threaded nut:
connected to the first annular sleeve;
meshed with the threaded selector; and, including at least a portion located within the first housing and non-rotatable within the first housing; and, a second clutch including a second annular sleeve and a second threaded nut, the second threaded nut:
connected to the second annular sleeve;
meshed with the threaded selector; and,
including at least a portion located within the second housing and non-rotatable within the second housing, wherein:

in a drive mode of the dual axle disconnect assembly, the first annular sleeve non-rotatably connects an axle of a first drive train of a vehicle to a drive gear of the first drive train, and the second annular sleeve non-rotatably connects an axle of a second drive train of the vehicle to a drive gear of the second drive train; and, to transition from the drive mode to a disconnect mode of the dual axle disconnect assembly, in which relative rotation between the drive gear and the axle of the first drive train is enabled and relative rotation between the drive gear and the axle of the second drive train is enabled:

the threaded selector is arranged to be rotated by an actuator;

the threaded selector is arranged to displace the first threaded nut and the first annular sleeve in a first direction; and, the threaded selector is arranged to displace the second threaded nut and the second annular sleeve in a second direction, opposite the first direction.

17. A method of operating a dual axle disconnect assembly, comprising:

for a drive mode of the dual axle disconnect assembly:
non-rotatably connecting, with an annular sleeve of a first clutch of the dual axle disconnect assembly, an axle of a first drive train of a vehicle to a drive gear of the first drive train; and,
non-rotatably connecting, with an annular sleeve of a second clutch of the dual axle disconnect assembly, an axle of a second drive train of the vehicle to a drive gear of the second drive train; and, transitioning from the drive mode to a disconnect mode of the dual axle disconnect assembly by:
rotating, with an actuator, a threaded selector,
displacing, with the threaded selector a threaded nut of the first clutch and a threaded nut of the second clutch;
displacing:
with the nut of the first clutch, the annular sleeve of the first clutch with respect to the axle of the first drive train; and,
with the nut of the second clutch, the annular sleeve of the second clutch with respect to the axle of the second drive train; and,
enabling relative rotation between the drive gear and the axle of the first drive train, and between the drive gear and the axle of the second drive train.

18. The method of claim 17, wherein transitioning from the drive mode to the disconnect mode includes:
displacing, with the threaded selector and in a first direction parallel to an axis of rotation of the threaded selector, the threaded nut of the first clutch within a first housing;
preventing, with the first housing, rotation of the threaded nut of the first clutch around the axis of rotation;
displacing, with the threaded selector and in a second direction, opposite the first direction, the threaded nut of the second clutch within a second housing; and,
preventing, with the second housing, rotation of the threaded nut of the second clutch around the axis of rotation.

19. The method of claim 17, wherein transitioning from the drive mode to the disconnect mode includes:
displacing, with the threaded selector, the threaded nut of the first clutch and the threaded nut of the second clutch toward each other;
displacing, with the threaded nut of the first clutch, the annular sleeve of the first clutch toward the annular sleeve of the second clutch; and,
displacing, with the threaded nut of the second clutch, the annular sleeve of the second clutch toward the annular sleeve of the first clutch.

20. The method of claim 17, further comprising:
rotating the annular sleeve of the first clutch with respect to the threaded nut of the first clutch; and,
rotating the annular sleeve of the second clutch with respect to the threaded nut of the second clutch.

\* \* \* \* \*